(12) United States Patent
D'Agostini et al.

(10) Patent No.: US 11,261,117 B2
(45) Date of Patent: Mar. 1, 2022

(54) SYSTEM AND METHOD FOR SYNCHRONIZED OXY-FUEL BOOSTING OF A REGENERATIVE GLASS MELTING FURNACE

(71) Applicant: Air Products and Chemicals, Inc., Allentown, PA (US)

(72) Inventors: Mark Daniel D'Agostini, Allentown, PA (US); Michael J. Gallagher, Coopersburg, PA (US); William J. Horan, Bear Creek Township, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 17/073,451

(22) Filed: Oct. 19, 2020

(65) Prior Publication Data
US 2021/0122659 A1    Apr. 29, 2021

Related U.S. Application Data

(60) Provisional application No. 62/925,949, filed on Oct. 25, 2019.

(51) Int. Cl.
| C03B 5/235 | (2006.01) |
| F23D 14/32 | (2006.01) |
| F23C 6/04 | (2006.01) |
| F23C 5/28 | (2006.01) |

(52) U.S. Cl.
CPC .............. *C03B 5/2353* (2013.01); *F23C 5/28* (2013.01); *F23C 6/045* (2013.01); *F23D 14/32* (2013.01); *F23D 2208/10* (2013.01)

(58) Field of Classification Search
None
See application file for complete search history.

(56) References Cited

U.S. PATENT DOCUMENTS

| 7,390,189 B2 | 6/2008 | D'Agostini |
| 10,584,051 B2 | 3/2020 | D'Agostini et al. |
| 2010/0313604 A1 | 12/2010 | Watson et al. |
| 2018/0237323 A1 | 8/2018 | D'Agostini et al. |

FOREIGN PATENT DOCUMENTS

| CN | 102369165 | 3/2012 |

*Primary Examiner* — Jason Lau
(74) *Attorney, Agent, or Firm* — Larry S. Zelson

(57) ABSTRACT

A system and method for synchronized oxy-fuel boosting of a regenerative glass melting furnace including first and second sets of regenerative air-fuel burners, a first double-staged oxy-fuel burner mounted in a first wall, and a second double-staged oxy-fuel burner mounted in a second wall, each oxy-fuel burner having a primary oxygen valve to apportion a flow of oxygen between primary oxygen and staged oxygen and a staging mode valve to apportion the flow of staged oxygen between an upper staging port and a lower staging port in the respective burner, and a controller programmed to control the primary oxygen valve and the staging mode valve of each of the first and second oxy-fuel burners to adjust flame characteristics of the first and second oxy-fuel burners depending on the state of operation of the furnace.

15 Claims, 16 Drawing Sheets

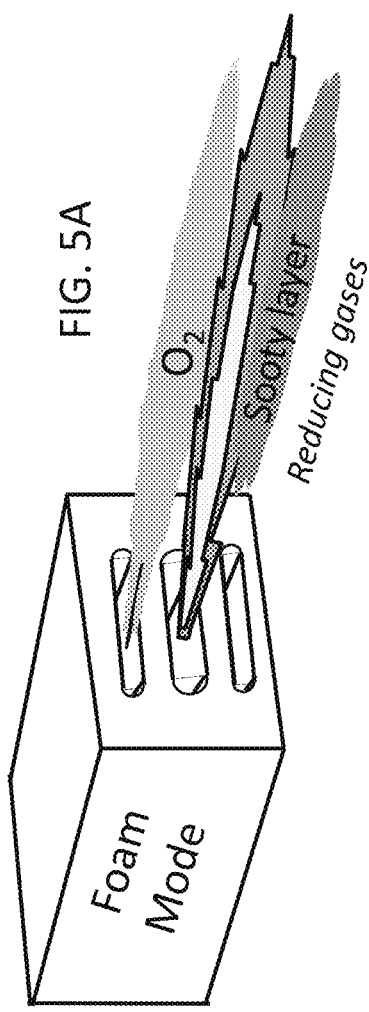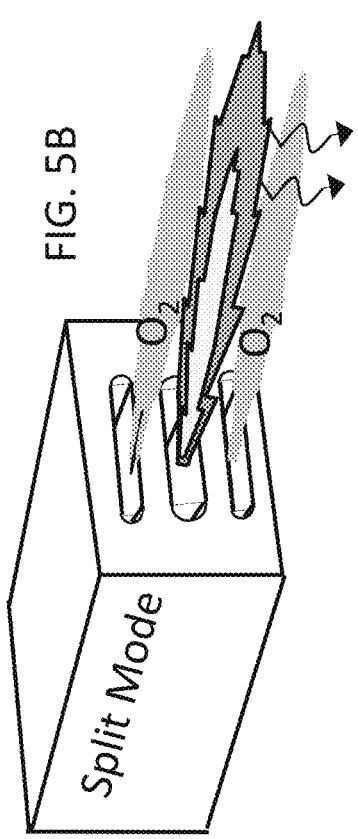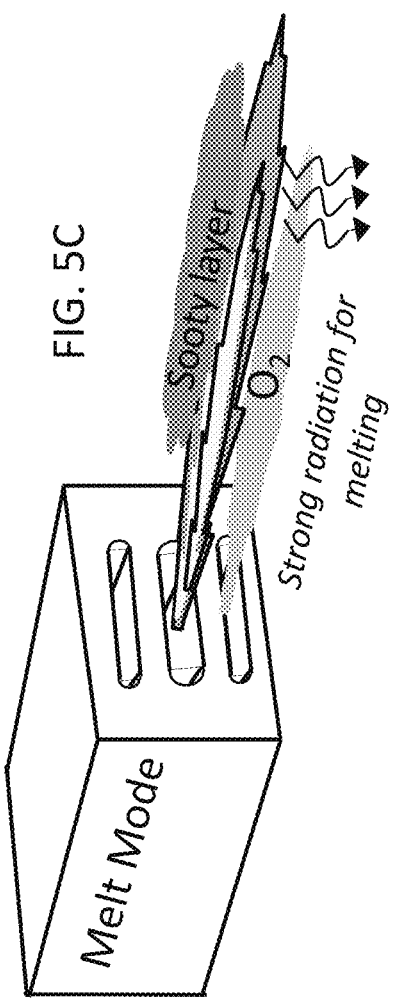

SYSTEM AND METHOD FOR SYNCHRONIZED OXY-FUEL BOOSTING OF A REGENERATIVE GLASS MELTING FURNACE

CROSS-REFERENCE TO RELATED APPLICATIONS

This application claims the priority of U.S. Provisional Application No. 62/925,949 filed on Oct. 25, 2019, which is incorporated by reference herein in its entirety.

BACKGROUND

This application relates to the use of oxy-fuel boost burners in regenerative glass melting furnaces, and specifically to improving the effectiveness of those burners.

Zero-port oxy-fuel boost burners have become widely accepted in float glass melting furnaces as a valuable means for increasing glass production and/or improving efficiency. However, boost burner effectiveness is often limited by flame interaction with the highly turbulent air-fuel flames. Moreover, both the strength and direction of these oxy-flames and their air-fuel flame interactions are dramatically shifted following each regenerator reversal cycle. These factors can cause negative effects, including overheating of the charge wall and snubbing of the flame, causing concentrated heat release close to the breast wall and/or flame lofting toward the crown.

Oxy-fuel boost burners have been employed in air-fired regenerative furnaces for a few decades and the benefits are well known. The primary benefits include higher furnace efficiency and/or lower fuel consumption, higher productivity, improved glass quality, and lower NOx. While oxy-boosting has its benefits, there are also challenges such as maintaining a consistent, highly luminous flame that can withstand the high levels of turbulence created inside air-fired regenerative glass furnaces. The periodic nature of the firing direction within regenerative furnace creates changing air currents and turbulence patterns that can cause the boost burner flames to loft, deflect, and become otherwise unstable. Unstable boost burner flames can result in overheating of the nearby charge wall. Also, premature flame shortening or snubbing can cause extreme flame conditions such as, on the one hand, concentrated heat release close to the breast wall and/or, flame lofting toward the crown. Such occurrences often result in overheating of furnace refractories (breast wall/crown/charge end wall) and lowering of heat transfer rate between the flame and glass surface. On the other hand, combustion space turbulence can also interrupt mixing between fuel and oxygen, leading to incomplete combustion. This is especially true with staged oxy-fuel burners, where the mixing of oxygen and fuel is inherently delayed by redirecting a portion of the oxygen above or below the flame in order to create a longer more luminous flame. Hence, interaction between combustion space turbulence and a staged oxy-fuel burner can lead to high emissions of carbon monoxide exhausted through the furnace flue ducts.

FIG. 1 schematically depicts a typical regenerative furnace 10 having regenerators 12A and 12B on opposite sides of the furnace 10, a charge end 14 where solid glass melting materials are introduced into the furnace 10, and an exit end 16 where molten glass exits the furnace 10 (the direction of glass flow is shown by the arrow labeled G). Each regenerator 12A, 12B has a set of air-fuel burner ports (six are shown in the depicted embodiment, numbered 1 through 6 from the charge end 14 to the exit end 16, but a set can include one or more burners). In the depicted operating mode, the regenerator 12B is firing (i.e., its air-fuel burners 1-6 are operative) while the regenerator 12A is exhausting combustion products from the furnace 10. Additionally, oxy-fuel boost burners are shown at a "zero-port" location (each labeled with a 0), and both oxy-fuel boost burners fire continually, regardless which regenerator 12A, 12B is firing and which is exhausting. In this operating mode, potential gas recirculation zones 18 can develop in the horizontal (firing) plane between the Port 1 air-fired burners and the Port 0 oxy-fuel boost burners. These recirculation zones can cause the boost burner flames to become entrained into the flow of the nearest air-fired burner (when firing on the same side) or it can alternately impede or deflect the flow of a boost burner firing in the opposing direction. This situation was modeled using Ansys Fluent computational fluid dynamic (CFD) simulation tools. In the three-dimensional simulation, a typical air-fired regenerative furnace size and geometry was replicated based on the production rate of 650 tons per day. FIGS. 2 and 3 show CFD modeling results in the horizontal (firing) and vertical (charge wall) planes, respectively. FIG. 2 shows bending of the oxy-fuel flame (the arrow B) toward the charge end wall 14 on the exhaust side E of the furnace 10 (and bending of the oxy-fuel flame toward the air-fuel flames on the firing side F of the furnace 10). Accordingly, FIG. 3 shows a potentially overheated zone 14A on the charge end wall 14. These results strongly support the aforementioned assertions on the deleterious effects of the combustion space flow field on the oxy-fuel zero-port boost burner that is opposing the flow field. A principal aim of the systems and methods described herein is the elimination of these negative effects while preserving and maximizing the beneficial effects of boost burners.

SUMMARY

By understanding the nature of the interactions between the cycle air-fuel burner operation of a regenerative furnace and the oxy-fuel boost burner flames, the present inventors have developed an advanced burner technology that is capable of automatically adjusting flame properties (particularly length, luminosity and momentum) with each regenerator reversal to avoid negative effects, while maximizing oxy-fuel performance benefits. This development combines advanced controls technology with the recently a double-staged oxy-fuel flat-flame burner. Both the methodology and beneficial results of field implementation of synchronized oxy-fuel boost burners are described herein.

Aspect 1. A system for synchronized oxy-fuel boosting of a regenerative glass melting furnace having a first set of regenerative air-fuel burners and a second set of regenerative air-fuel burners, and a furnace control system programmed to control alternate firing of the first set of air-fuel burners and the second set of air-fuel burners such that when the first set of air-fuel burners is firing the second set of air-fuel burners is regenerating, and when the first set of air-fuel burners is regenerating the second set of air-fuel burners is firing, the system comprising: a first double-staged oxy-fuel burner mounted in a first wall of the furnace and having a primary oxygen valve to apportion a flow of oxygen between primary oxygen and staged oxygen and a staging mode valve to apportion the flow of staged oxygen between an upper staging port and lower staging port; a second double-staged oxy-fuel burner mounted in a second wall of the furnace, the second wall being opposite the first wall, and having a primary oxygen valve to apportion a flow of oxygen between a flow of primary oxygen and a flow of staged oxygen and a staging mode valve to apportion the flow of staged oxygen between a flow of upper staged oxygen to the upper staging port and a flow of lower staged oxygen to the lower staging port; and a controller programmed to: receive a signal from the furnace control system indicating which of the first and second sets for air-fuel burners is firing and which of the first and second sets of air-fuel burners is regenerating; and send signals to the actuate the primary oxygen valve and the staging mode valve of the first double-staged oxy-fuel burner and to actuate the primary oxygen valve and the staging mode valve of the second double-staged oxy-fuel burner, in response to the signal from the furnace control system, to adjust flame characteristics of the first double-staged oxy-fuel burner and the second double-staged oxy-fuel burner.

Aspect 2. The system of Aspect 1, wherein each of the first double-staged oxy-fuel burner and the second double-staged oxy-fuel burner includes a central precombustor configured and arranged to receive a flow of fuel and the flow of primary oxygen, an upper staging port configured and arranged to receive the flow of upper staged oxygen, and a lower staging port configured and arranged to receive the flow of lower staged oxygen, wherein the flow of oxygen supplied to the each of the first and second double-staged oxy-fuel burners is the sum of the flow of primary oxygen and the flow of the staged oxygen, and wherein the flow of staged oxygen is the sum of the flow of upper staged oxygen and the flow of lower staged oxygen.

Aspect 3. The system of Aspect 2, wherein the primary oxygen valve of each of the first and second double-staged oxy-fuel burners is configured and arranged to be actuated between a primary flame position in which a majority of the flow of oxygen is apportioned to the flow of primary oxygen and a staged flame position in which a majority of the flow of oxygen is apportioned the flow of stage oxygen; and wherein the staging mode valve of the each of the first and second double-staged oxy-fuel burners is configured and arranged to be actuated between at least two positions selected from: a foam mode position in which a majority of the flow of staged oxygen is apportioned to the flow of upper staged oxygen; a split mode position in which the flow of staged oxygen is apportioned between the flow of upper staged oxygen and the flow of lower stage oxygen; and a melt mode position in which a majority of the flow of staged oxygen is apportion to the flow of lower staged oxygen.

Aspect 4. The system of Aspect 1, wherein the first set of regenerative air-fuel burners is positioned in the first wall and the second set of regenerative air-fuel burners is positioned in the second wall, the furnace further comprising a charge wall perpendicular to and interconnecting between the first wall and the second wall.

Aspect 5. The system of Aspect 4, wherein the first double-staged oxy-fuel burner is positioned between the first set of air-fuel burners and the charge wall, and wherein the second double-staged oxy-fuel burner is positioned between the second set of air-fuel burners and the charge wall.

Aspect 6. The system of Aspect 1, wherein the first set of regenerative air-fuel burners and the second set of regenerative air-fuel burners are both positioned in a wall perpendicular to and interconnecting between the first wall and the second wall.

Aspect 7. The system of Aspect 4, wherein when the controller receives a signal that the first set of air-fuel burners is firing and the second set of burners is regenerating, the controller sends signals to actuate the primary oxygen valve of the first double-staged burner to the staged position and the staging mode valve of the first double-staged oxy-fuel burner to the melt mode position, and to actuate the primary oxygen valve of the second double-staged oxy-fuel burner to the primary flame position and the staging mode valve of the second double-staged oxy-fuel burner to the split mode position; and wherein when the controller receives a signal that the second set of air-fuel burners is firing and the first set of burners is regenerating, the controller sends signals to actuate the primary oxygen valve of the first double-staged burner to the primary flame position and the staging mode valve of the first double-staged oxy-fuel burner to the split mode position, and to actuate the primary oxygen valve of the second double-staged oxy-fuel burner to the staged position and the staging mode valve of the second double-staged oxy-fuel burner to the melt mode position.

Aspect 8. The system of Aspect 7, further comprising at least one of a first bottom thermocouple positioned to measure a glass bottom temperature proximal to the first wall and the charge wall; a second bottom thermocouple positioned to measure a glass bottom temperature proximal to the second wall and charge wall; and a crown thermocouple positioned to measure a crown temperature near the charge wall; wherein the controller is further programmed to receive signals from at least one of the first bottom thermocouple, the second bottom thermocouple, and the crown thermocouple indicating the respective temperatures; and to send signals to actuate the primary oxygen valve and the staging mode valve of the first double-staged oxy-fuel burner and to actuate the primary oxygen valve and the staging mode valve of the second double-staged oxy-fuel burner in response to the signals from the furnace control system and the at least one of the first bottom thermocouple, the second bottom thermocouple, and the crown thermocouple, to adjust flame characteristics of the first double-staged oxy-fuel burner and the second double-staged oxy-fuel burner.

Aspect 9. A method of synchronized oxy-fuel boosting of a regenerative glass melting furnace having a first set of regenerative air-fuel burners and a second set of regenerative air-fuel burners; a first double-staged oxy-fuel burner mounted in a first wall of the furnace; and a second double-staged oxy-fuel burner mounted in the second wall of the furnace; each of the first double-staged oxy-fuel burner and the second double-staged oxy-fuel burner including a central precombustor configured and arranged to receive a flow of fuel and the flow of primary oxygen, an upper staging port configured and arranged to receive the flow of upper staged oxygen, and a lower staging port configured and arranged to receive the flow of lower staged oxygen, the method comprising: alternating firing of the first set of air-fuel burners and the second set of air-fuel burners, such that when the first set of air-fuel burners is firing the second set of air-fuel burners is regenerating, and when the first set of air-fuel burners is regenerating the second set of air-fuel burners is firing; detecting which of the first and second sets for air-fuel burners is firing and which of the first and second sets of air-fuel burners is regenerating; and controlling the flow of primary oxygen to the precombustor, the flow of upper staged oxygen, and the flow of lower staged oxygen for each of the first double-staged oxy-fuel burner and the second double-staged oxy-fuel burner, based on which of the first and second sets for air-fuel burners is firing and which of the first and second sets of air-fuel burners is regenerating, to adjust flame characteristics of the first double-staged oxy-fuel burner and the second double-staged oxy-fuel burner.

Aspect 10. The method of Aspect 9, wherein the flow of oxygen supplied to the first double-staged oxy-fuel burner is the sum of the flow of primary oxygen and the flow of staged oxygen, and wherein the flow of staged oxygen is the sum of the flow of upper staged oxygen and the flow of lower staged oxygen Aspect 11. The method of Aspect 9, wherein the first set of regenerative air-fuel burners is positioned in the first wall and the second set of regenerative air-fuel burners is positioned in the second wall, the furnace further comprising a charge wall perpendicular to and interconnecting between the first wall and the second wall.

Aspect 12. The method of Aspect 11, wherein the first double-staged oxy-fuel burner is positioned between the first set of air-fuel burners and the charge wall, and wherein the second double-staged oxy-fuel burner is positioned between the second set of air-fuel burners and the charge wall.

Aspect 13. The method of Aspect 9, wherein the first set of regenerative air-fuel burners and the second set of regenerative air-fuel burners are both positioned in a wall perpendicular to and interconnecting between the first wall and the second wall.

Aspect 14. The method of Aspect 11, wherein the first wall of the furnace is positioned to the right of the charge wall and the second wall of the furnace is positioned to the left of the charge wall, further comprising: when the first set of air-fuel burners is firing and the second set of burners is regenerating, actuating the primary oxygen valve of the first double-staged burner to the staged position and the staging mode valve of the first double-staged oxy-fuel burner to the melt mode position, and actuating the primary oxygen valve of the second double-staged oxy-fuel burner to the primary flame position and the staging mode valve of the second double-staged oxy-fuel burner to the split mode position; and when the second set of air-fuel burners is firing and the first set of burners is regenerating, actuating the primary oxygen valve of the first double-staged oxy-fuel burner to the primary flame position and the staging mode valve of the first double-staged oxy-fuel burner to the split mode position, and actuating the primary oxygen valve of the second double-staged oxy-fuel burner to the staged position and the staging mode valve of the second double-staged oxy-fuel burner to the melt mode position.

Aspect 15. The method of Aspect 14, further comprising measuring at least one of a first glass bottom temperature proximal to the first wall and the charge wall, measuring a second glass bottom temperature proximal to the second wall and the charge wall, and measuring a crown temperature near the charge wall; and controlling the flow of primary oxygen to the precombustor, the flow of upper staged oxygen, and the flow of lower staged oxygen for each of the first double-staged oxy-fuel burner and the second double-staged oxy-fuel burner, based on which of the first and second sets for air-fuel burners is firing and which of the first and second sets of air-fuel burners is regenerating, the measured first glass bottom temperature, the measured second glass bottom temperatures, and the measured crown temperature, to adjust flame characteristics of the first double-staged oxy-fuel burner and the second double-staged oxy-fuel burner.

The various aspects of the system disclosed herein can be used alone or in combinations with each other.

BRIEF DESCRIPTION OF THE DRAWINGS

FIGS. 5A, 5B, and 5C are schematics showing various staging modes of the double-staged burner of FIG. 4. In a Foam Mode (FIG. 5A), oxygen is staged mainly above the primary flame so as to create a long flame with a sooty underlayer containing reducing gases (CO) for foam destabilization. In a Split Mode (FIG. 5B), oxygen is staged both above and below the primary flame so as to create a high-momentum, high-luminosity flame that works well in locations with high turbulence. In a Melt Mode (FIG. 5C, oxygen is staged mainly below the primary flame so as to create a long flame with a luminous underside for high intensity melting with crown shielding.

FIG. 10A shows a single-staged burner with minimal staging; FIG. 10B shows a double-staged burner without synchronized boosting; and FIG. 10C shows a double-staged burner with synchronized boosting. The black dashed line represents the same position on the charge end wall in each photo.

DETAILED DESCRIPTION

To maximize the benefits of oxy-boosting and overcome the present challenges, the inventors have developed a synchronized boosting system capable of automatically adjusting flame properties (particularly length, luminosity, and momentum) with each regenerator reversal. The synchronized boosting system allows furnace engineers to customize each burner's settings for both firing directions in accord with specific gas flow and flame conditions. Such a system can ensure that each burner's flame quality is maximized to overcome the negative effects of turbulence generated by the regenerator reversal cycles.

Figure 1:
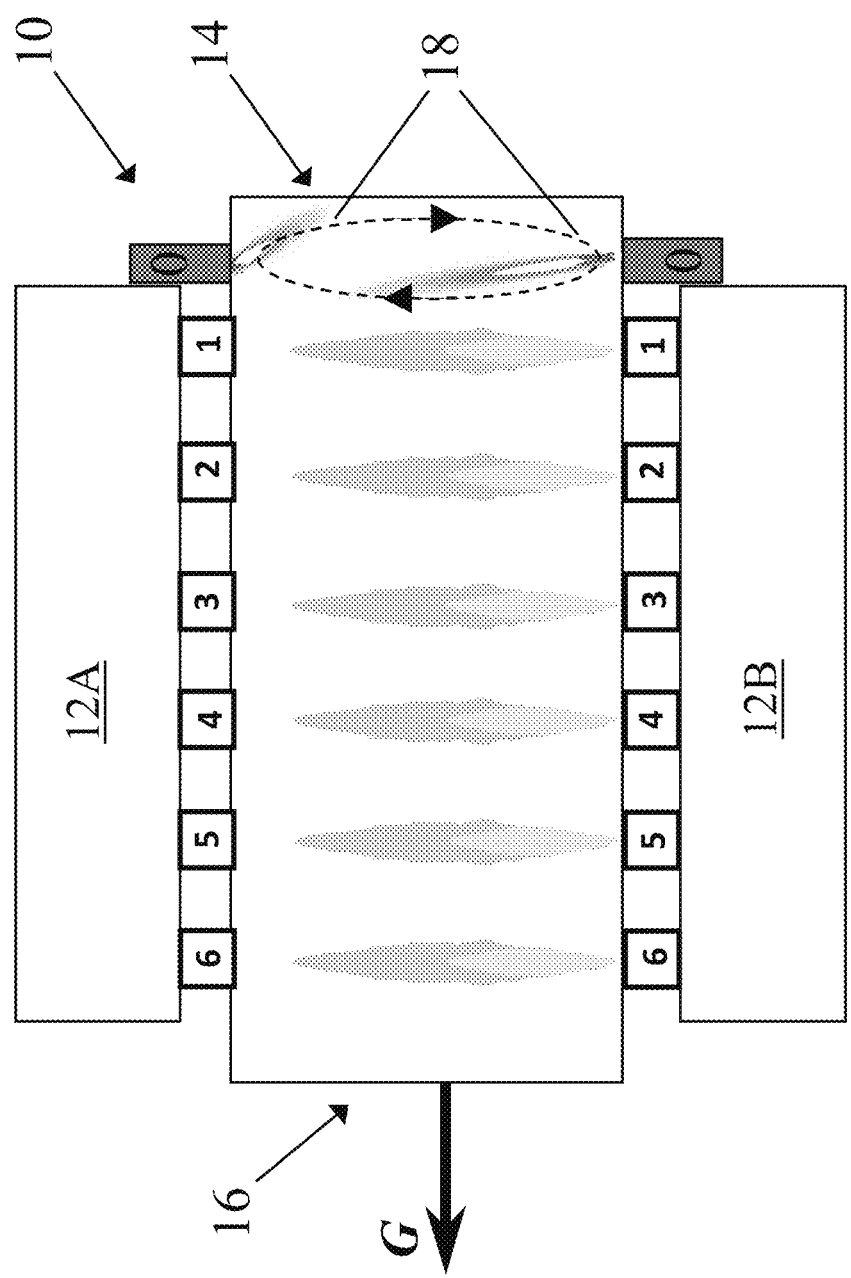
FIG. 1 is a top schematic view of a side-port regenerative furnace showing zero port oxy-fuel boost burners, illustrating that a zone of recirculated gases can develop between the charge wall and the Port 1 air-fuel burners, which can cause the boost burner flames to deflect or be drawn into the nearby Port 1 air-fuel flame.
Figure 2:
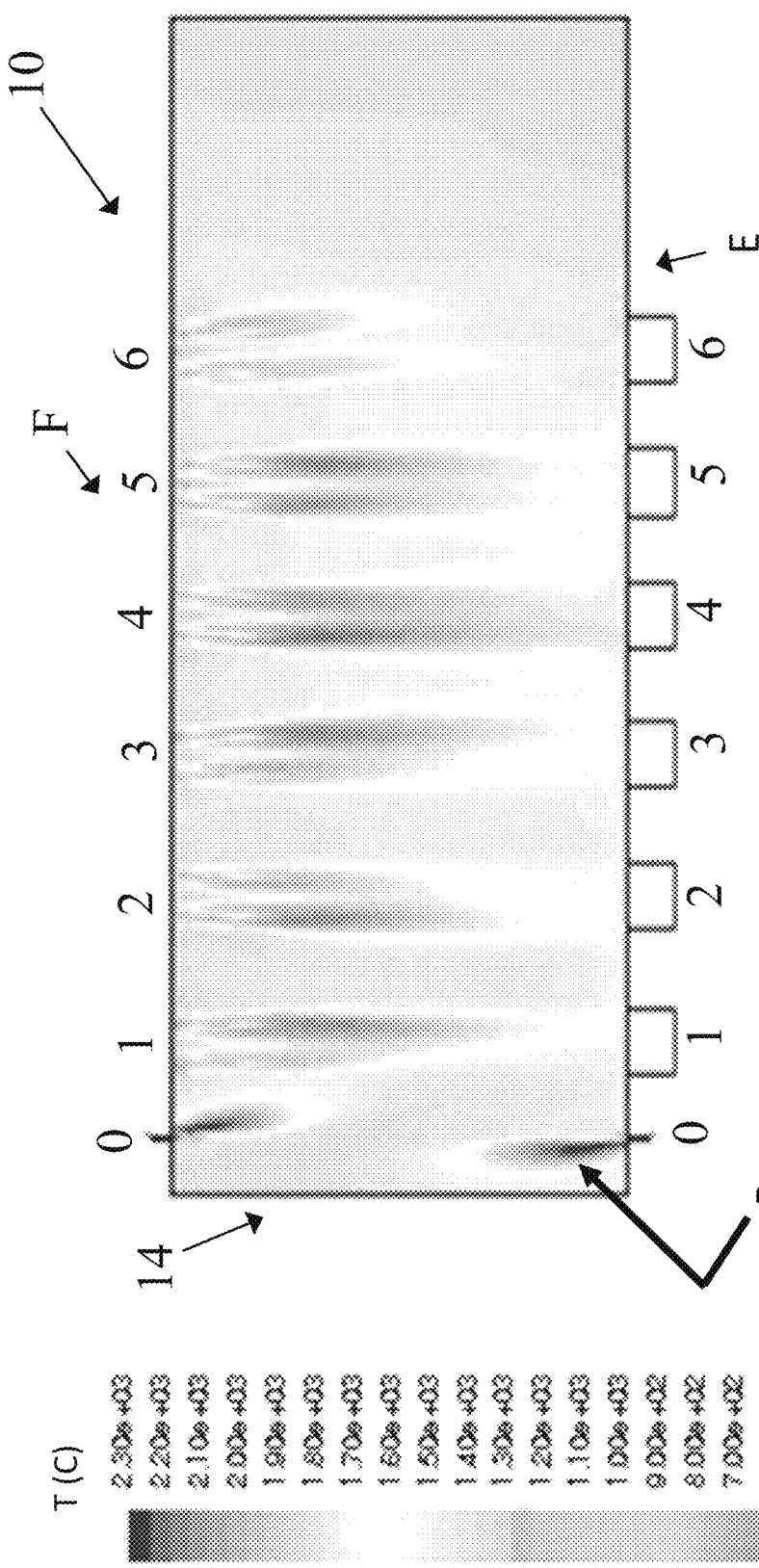
FIG. 2 shows CFD modeling results for a top view of a regenerative furnace with zero port oxy-fuel boost burners, showing the effect of recirculation patterns near the boost burners (far left side in the figure) that can cause the boost burner flames to deflect.
Figure 3:
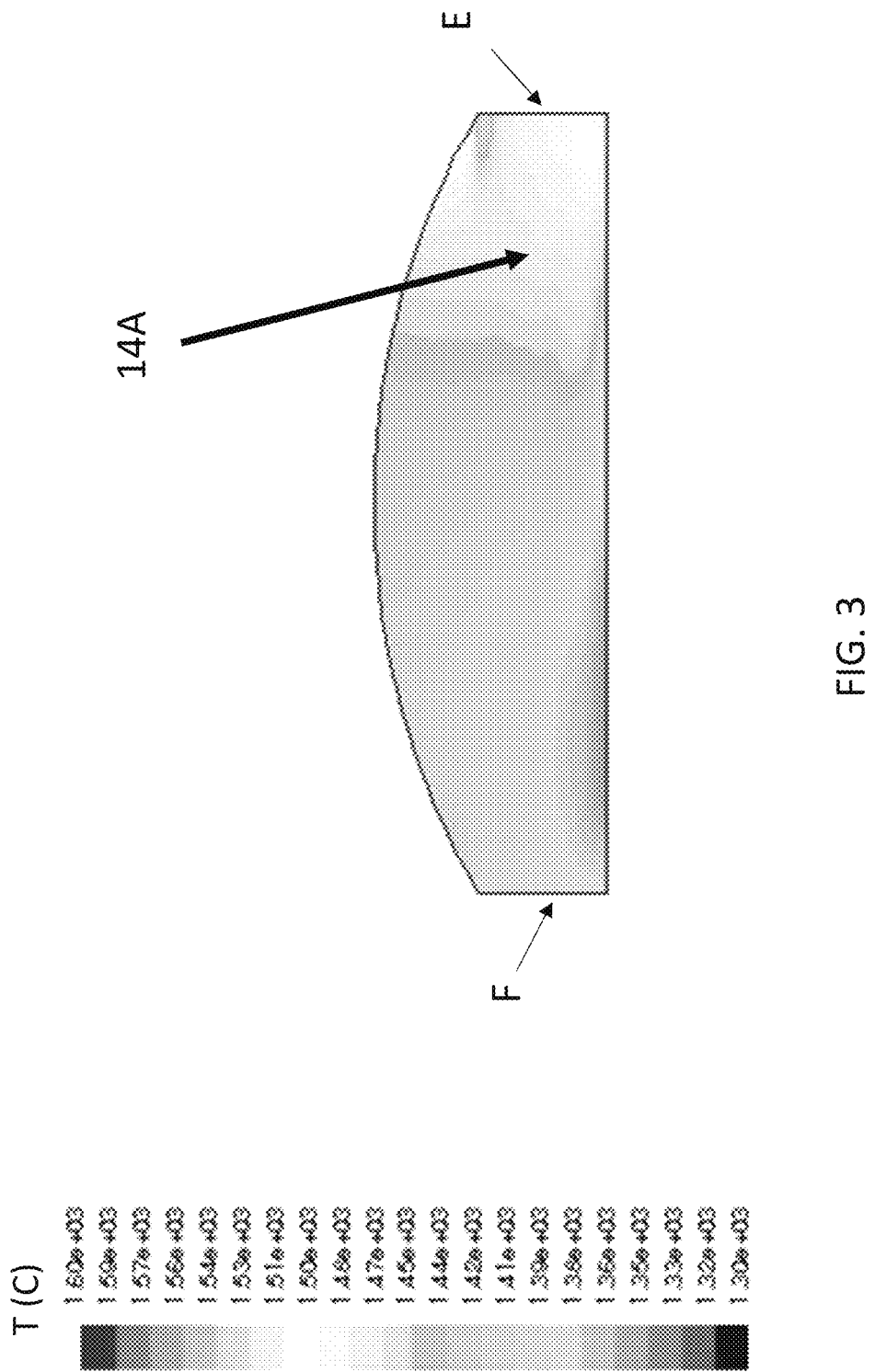
FIG. 3 shows CFD modeling results for a side view of the furnace of FIG. 2.
Figure 4:
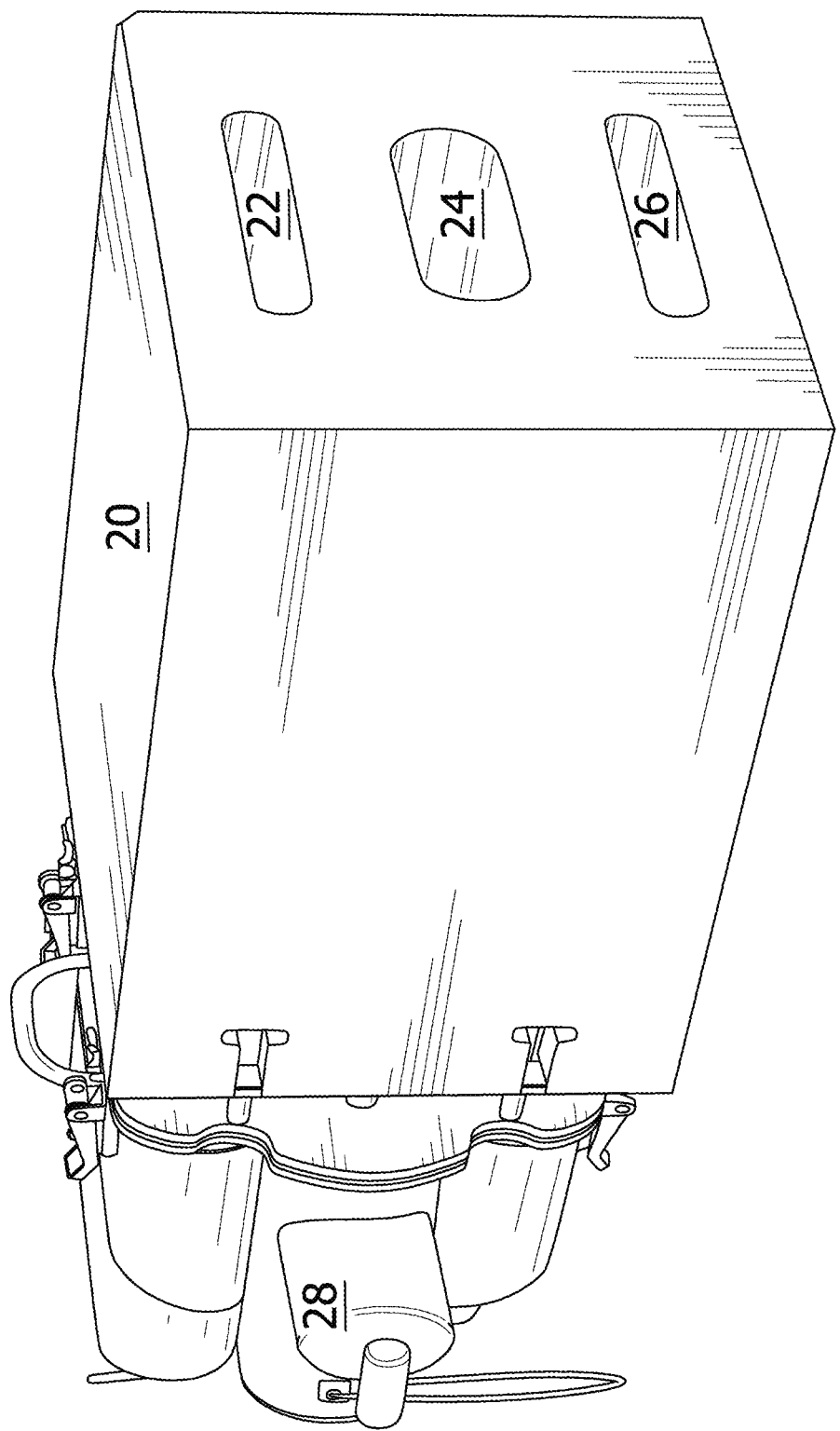
FIG. 4 is a photograph of a front perspective view of double-staged oxy-fuel burner from burner block hot face, showing a central primary nozzle (fuel and oxygen forming a fuel-rich primary flame), and upper and lower staging ports (flowing oxygen).

The synchronized boosting system utilizes a double-staged oxy-fuel burner 20 as shown in FIG. 4, which is described in detail in in U.S. Pat. No. 10,584,051, incorporated herein by reference. The double-staged burner was designed to achieve a very high degree of oxygen staging with high momentum and luminosity; flame properties that are ideal for oxy-fuel boosting applications. The double-staged burner has a high level of adjustability including two valves that control the direction and amount of staging oxygen. These valves are herein referred to as the staging mode valve and the primary oxygen valve, respectively.

Performance of the double-staged burner in a boosting application is compared herein to the earlier generation single-staged burner (see U.S. Pat. No. 7,390,189). In addition, the disclosure herein shows the impact on the performance of the double-staged burner of adding synchronization with the operation of the regenerative furnace. The impact of various furnace operational parameters for all three cases, single-staged burner boost, double-staged burner boost without synchronized system and the double-staged burner boost with synchronization are described herein, including the effects on energy consumption, local furnace temperatures, glass defects.

The double-staged burner enables the synchronized boosting system to be effective largely because of its high degree of adjustability in controlling flame properties such as momentum, length, and luminosity. The double-staged burner is a flat flame oxy-fuel burner designed for the glass industry that has several features which include increased flame radiation for high fuel efficiency, foam reduction capability, reduced glass defects and low NOx emissions.

The burner block of the double-staged burner 20 has three ports; a central pre-combustor port 24 where the fuel and primary oxygen initiate combustion and the flame is rooted and stabilized, an upper oxygen staging port 22 and a lower oxygen staging port 26. The double-staged burner 20 has unique oxygen staging capability where the staging oxygen can be directionally controlled and proportioned through either or both of the upper or lower staging ports adjacent to the primary pre-combustor via a staging mode valve 30. The modes of oxygen staging include a Foam Control mode, a Melt mode, and a Split mode. Such directional control of staging oxygen provides several benefits including adjustment of flame length, momentum, luminosity and gas atmosphere adjacent the glass surface. FIGS. 5A to 5C depict the various staging modes for the double-staged burner 20. Oxygen staging also prevents NOx formation by delaying mixing of oxygen and natural gas resulting in a lower flame temperature.

The staging mode valve 30 enables attainment of the following three distinct mode of burner operation:

Split Mode.

In the Split Mode, as shown in FIG. 5B, an essentially equal amount of oxygen is directed to both the upper O2 staging port 22 and the lower O2 staging port 26. This results in a shorter, luminous and relatively high momentum flame that is stable even amidst an opposing turbulent flow environment. The Split mode can be especially useful when the boost burner is firing from the exhaust side of the regenerative furnace.

Melt Mode.

In the Melt Mode, as shown in FIG. 5C, oxygen is directed to the lower oxygen staging port 26 of the burner block, which is below the primary flame. The flame will develop a bright bottom surface due to thermal radiation caused by the localized combustion of staging oxygen with fuel on the under-side of the flame jet. Since the soot formed in the largely fuel-rich jet acts as an optical shield limiting upward radiation, the high radiation produced in Melt mode is preferentially directed downward towards the glass surface and has been shown to accelerate the melting process.

Foam Mode.

In the Foam Mode (or Foam Control Mode), as shown in FIG. 5A, oxygen is directed to the upper oxygen staging port 22 of the burner block which is above the primary flame. The resulting flame has a sooty underside containing reducing gases made up of primarily carbon monoxide (in concentrations of several percent). The reducing atmosphere created by the flame extends out above the glass surface acts to dissipate surface foam.

Use of a primary oxygen valve 28 moderates the combustion characteristics of each of the three aforementioned staging modes. When the primary oxygen valve 28 is 100% open, approximately 75% of the total incoming oxygen to the burner is passing through the primary nozzle that feeds into the central burner block (pre-combustor) passage. This condition enhances mixing between oxygen and natural gas in the central nozzle and creates a shorter, more stable flame with higher momentum. When the primary oxygen valve 28 is closed, approximately 5% of the burner oxygen flow bleeds through the primary nozzle with the remainder (95%) distributed to the upper and/or lower staging ports, in accordance with the selected staging mode. When the primary oxygen valve 28 is closed, it is possible to achieve the maximum amount of oxygen staging and the flame length will become its maximum for a given fuel flow (firing) rate. In addition, NOx emissions will decrease while flame luminosity will increase due the abundance of intermediate soot formed. Moreover, flame momentum is reduced with as the primary oxygen valve is progressively closed.

Figure 6:
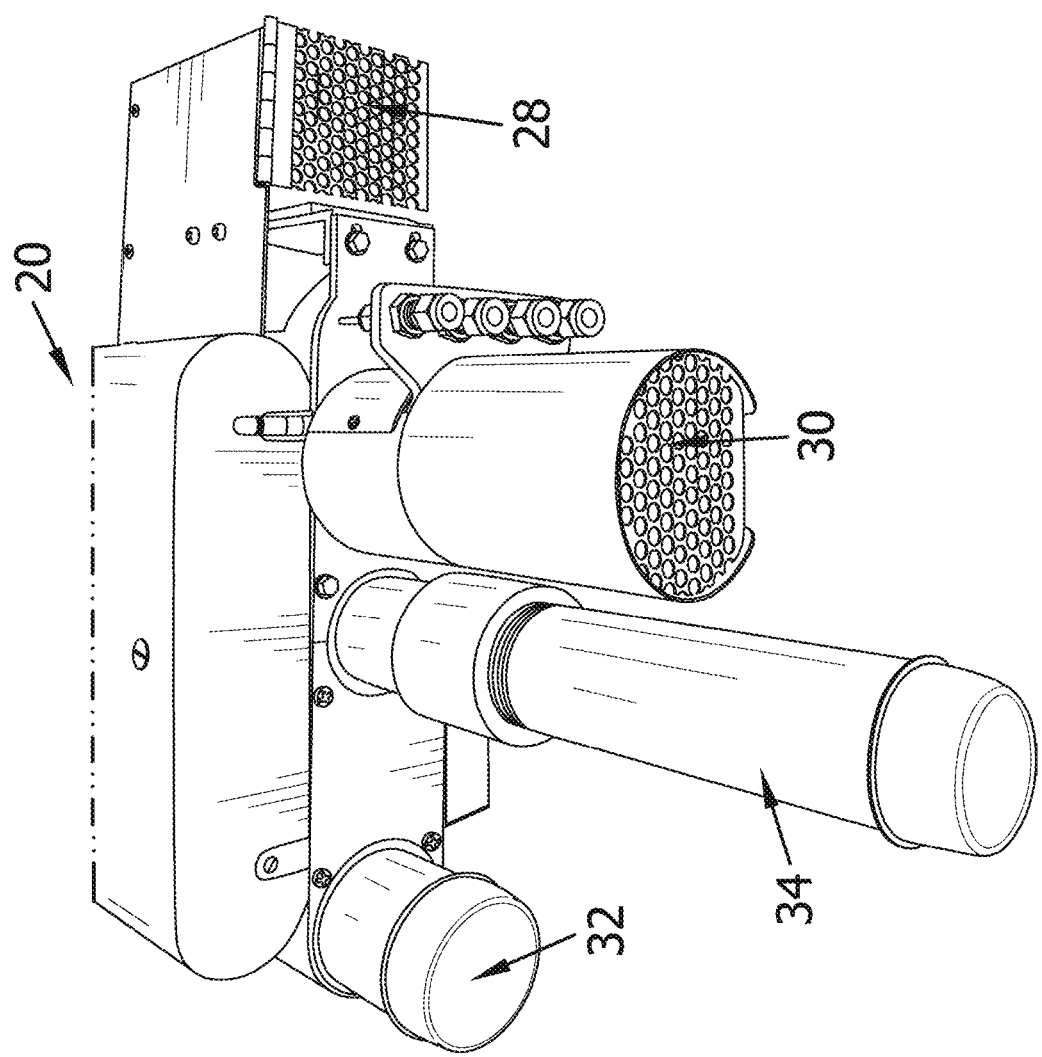
FIG. 6 is a rear view photograph of a double-staged oxy-fuel burner with pneumatic actuators installed to enable automatic control of the staging mode and the primary oxygen (staging) valve.

The synchronized boosting system enables attainment of optimal boost burner flame properties, particularly length, luminosity, and momentum in conjunction with each regenerator reversal cycle in air-fired side port furnaces. This is accomplished via automatic, remote control of the flame properties using pneumatic or electric actuation of the burner's staging mode valve 30 and primary oxygen valve 28. In a preferred embodiment, the burner is equipped with pneumatic actuators for both oxygen valves 28, 30. A representative pneumatic actuator arrangement on the two valves is shown in FIG. 6. The pneumatic actuators are typically double-acting and, hence, each is capable of achieving two distinct control positions that can be preset with mechanical stops. A synchronized burner control system works in conjunction with the plant or furnace overall control system to change valve positions to optimal pre-set locations with each regenerator reversal cycle. The optimum burner settings can be determined, for example during initial setup of the system, through visual observation of the boost burner flames and optical temperature measurements of the charge end wall and breast walls near the boost burners. This may be an repetitive process that involves assessing flame quality and appearance and also measuring local refractory temperatures at various valve settings. It should be noted that the optimum valve positions could vary depending on a variety of factors including but not limited to localized turbulence in the vicinity of the boost burners, altered gas flow patterns due to different furnace geometry from one installation to another, the firing rate of boost burners, the fuel distribution of the air-fired burners, and the flow capacity of the regenerators. The optimal valve position settings are then programmed into the synchronized system to ensure that the staging mode valves are moved to the optimal location during each reversal cycle.

Note that while the double-staged burner ideal for synchronized boosting due to its ability to broadly adjust combustion characteristics of the flame, even oxy-fuel burners with a single oxygen staging mode valve (e.g. U.S. Pat. No. 7,390,189) could easily be adapted to this inventive system.

Figure 7:
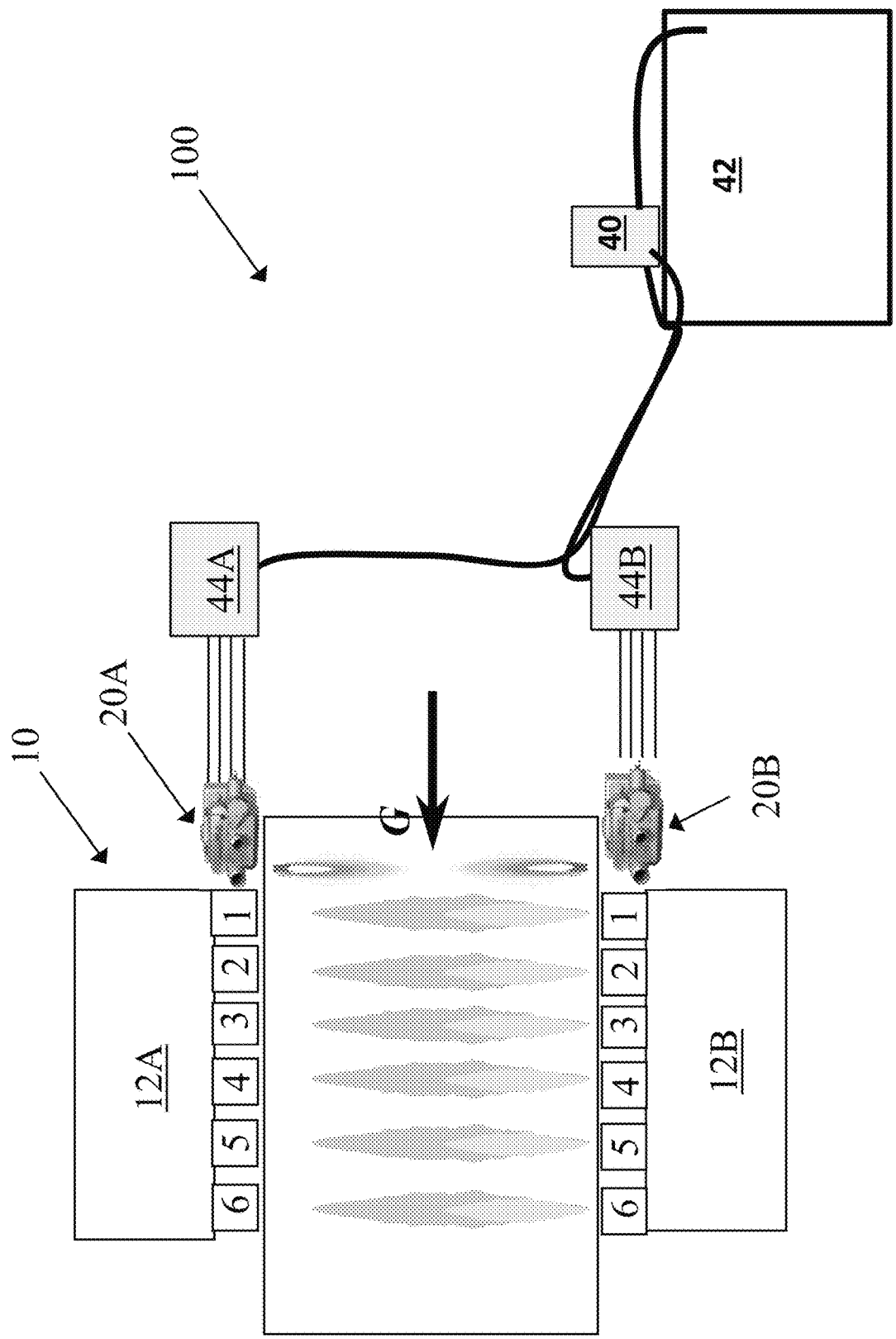
FIG. 7 is a schematic diagram showing an embodiment of a synchronized oxy-fuel boosting system, including two double-staged burners installed at the zero port location, two pneumatic control boxes, and a controller configured to control they system.

As shown in FIG. 7, the synchronized boosting system 100 uses a controller, such as programmable logic controller (PLC) 40, that receives a signal from the furnace distributed control system (DCS) 42 indicating when the reversals occur. The PLC then sends a signal to solenoids 44A and 44B, respectively that drive the pneumatic actuators corresponding to the staging mode valve 30 installed on each boost burner 20A and 20B, respectively. FIG. 7 depicts a typical layout of the components of a synchronized boosting system 100.

Figure 15:
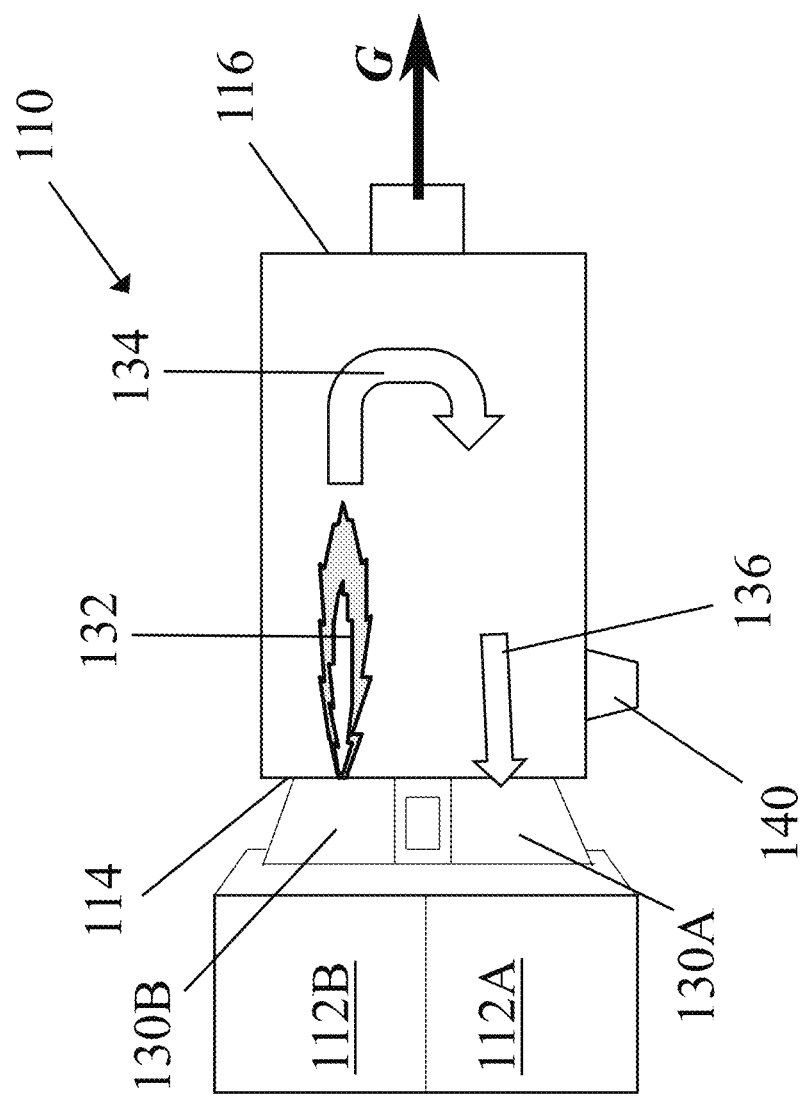
FIG. 15 is plan view schematic of an end-port regenerative furnace without oxy-fuel boost burners showing the circulation path of combustion products in the furnace.

In an alternate embodiment, some regenerative glass furnaces use an end-port air-fuel burner configuration. An end-port furnace 110 is shown in FIG. 15 with a first regenerator 112B having a first set of air-fuel burner ports 130B firing an air-fuel flame 132, while a second regenerator 112A having a second set of air-fuel burner ports 130A is exhausting, with both regenerators 112B and 112A positioned in a charge end 114 of the furnace 110. Each set of burner ports 130A and 130B may contain one or more air-fuel burners. Hot combustion products 134 circulating over the melt toward a discharge end 116 of the furnace 110 before recirculating and exiting the furnace 110 as flue gas 136. Solid charge is added to the furnace 110 via a charge port 140, and molten glass exits the furnace as shown by the flow arrow G. On a regular cycle, the regenerators reverse so that the first regenerator 112B is exhausting while the second regenerator 112A is firing. A first side wall 118B and a second side wall 118A opposite the first side wall 118B join the charge end 114 to the discharge end 116.

Figure 16:
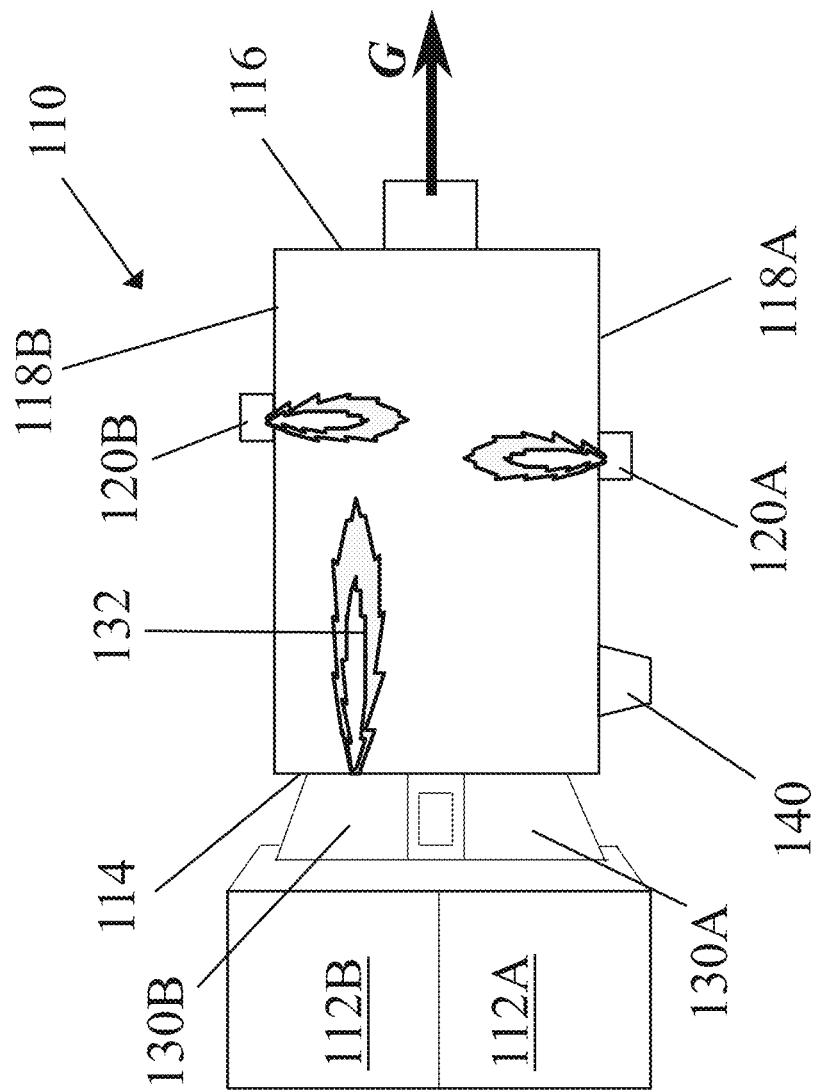
FIG. 16 is a plan view schematic of an end-port regenerative furnace with oxy-fuel boost burners.

FIG. 16 shows the addition of synchronized oxy-fuel boost burners 120A and 120B to the furnace 110. A first oxy-fuel boost burner 120B is positioned in the first side wall 118B, and a second oxy-fuel boost burner 120A is positioned in the second side wall 118A. While the boost burners 120A and 120B are in opposite walls 118A and 118B, they are not necessarily positioned directly opposite from each other. As in the side-port regenerative furnace 10, operation of the oxy-fuel boost burners 120A and 120B is synchronized to the reversal cycle of the air-fuel regenerators 112A and 112B to optimized performance.

Example in a Side-Port Regenerative Furnace

A synchronized boosting system was developed and installed at a 650 ton per day ("tpd") float glass furnace with a side-port configuration. The system replaced a single-staged burner operating without synchronized staging. Moreover, an intermediate phase of operation using the double-staged burner without synchronization was also carried out. The results comparing performance among these three phases of operation were validated through several months of operation. Results are presented herein for local glass and refractory crown temperature, glass defects and furnace melting efficiency.

Key furnace independent parameters during the trial included the glass pull (production) rate, the firing rate of each of the two boost burners and the percentage of glass cullet (recycle glass) mixed with raw glass making materials. The pull rate remained within +/−2% of the nominal 650 tpd set point, while the boost burner firing rates were held constant at 8.25 MMBtu/hr/burner. The cullet varied slightly among the phases as shown in Table 1.

TABLE 1

Average Cullet Percentage for Each Test Phase

| Burner Type: | Single-Staged Burner without Synchronization | Double-Staged Burner without Synchronization | Double-Staged Burner with Synchronization |
|---|---|---|---|
| Average Cullet (%) | 18 | 21.7 | 20 |

Manual optimization of the flame properties and, hence, preset staging mode valve positions was conducted prior to initiating the synchronized boosting system. Visual observations and optical temperature measurements using a 1-micron handheld pyrometer were used to determine the optimal staging mode and primary oxygen valve settings for each burner and reversal firing cycle.

Table 2 below shows the optimal valve settings determined for the double-staged burners with synchronized boosting system during the test period. These optimal valve settings were selected for this specific case based on the local conditions during the test period. The optimal valve settings may change over time at the same installation or for different installations due to a variety of factors including but not limited to localized turbulence in the vicinity of the boost burners, altered gas flow patterns due to different furnace geometry from one installation to another, the firing rate of the oxy-fuel boost burners, the fuel distribution of the air-fired burners, and the flow capacity of the regenerator. In general, the optimum conditions for an oxy-fuel boost burner that is firing in opposition to the air-fired burners would include increasing the primary oxygen flow and changing the staging mode to split mode, which provides a higher momentum flame. The generalized optimum conditions for an oxy-fuel boost burner that is firing on the same side as the air-fired burners include decreasing the primary oxygen (increase staging oxygen) and setting the staging mode to melt mode for maximum heat transfer to the batch material below. The exact valve settings that determine the optimum state should be determined in the field based on observance of the flames and/or temperature indicators including, but not limited to, furnace thermocouples and/or optical temperature measurements. A range of primary oxygen and staging oxygen flows that may typically encompass the optimum conditions include the following: for the oxy-fuel boost burner firing in opposition to the air-fired burners, 60% to 90% primary oxygen flow and the balance (40% to 10%) staged oxygen flow; and for the oxy-fuel boost burner firing in the same direction as the air-fired burners, 5% to 40% primary oxygen flow and the balance (95% to 60%) to the flow of staged oxygen.

Tables 3 and 4 show the analogous information for the non-synchronized double-staged burner and non-synchronized single-staged burner, respectively.

TABLE 2

Optimized Staging Settings for Double-Staged Synchronized Boost Burner

| Boost Burner Position | Direction of Boost Burner Flame with Respect to Air-Fuel Flames | Staging Mode | Primary Oxygen (% Open) |
|---|---|---|---|
| Left Burner | Same Direction | Melt Mode | 0% |
| | Opposed Direction | Split Mode | 50% |
| Right Burner | Same Direction | Split Mode | 25% |
| | Opposed Direction | Melt Mode | 100% |

TABLE 3

Staging Settings for Double-Staged Non-Synchronized Boost Burner

| Boost Burner Position | Staging Mode | Primary Oxygen (% Open) |
|---|---|---|
| Left Burner | Split | 50 |
| Right Burner | Split | 75 |

TABLE 4

Staging Settings for Single-Staged Non-Synchronized Boost Burner

| Boost Burner Position | % Primary Oxygen (balance staged under flame) |
|---|---|
| Left Burner | 90 |
| Right Burner | 90 |

Results.

Impact on Glass Bottom Temperature.

Figure 8:
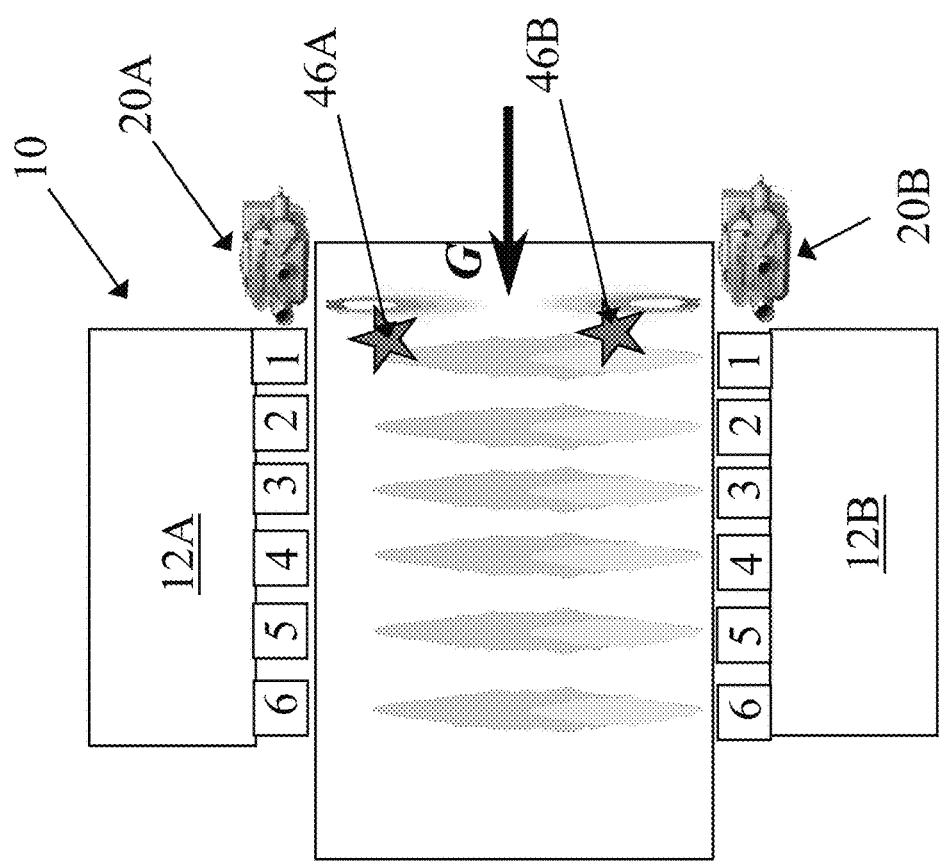
FIG. 8 is a plan view schematic of a regenerative furnace with oxy-fuel boost burners showing locations of bottom thermocouples.

Increasing bottom temperatures strengthens the natural circulation currents within the glass melt, increasing glass residence time, thereby reducing the number of gaseous inclusions (seeds or bubbles) within the glass product. The glass bottom temperatures were recorded on the left and right side of the furnace with the nearest thermocouples 46A (on the right side, labeled "R" in the graph of FIG. 9) and 46B (on the left side, labeled "L") in the graph of FIG. 9) located approximately 12 feet down tank of the boost burners as shown in FIG. 8.

Figure 9:
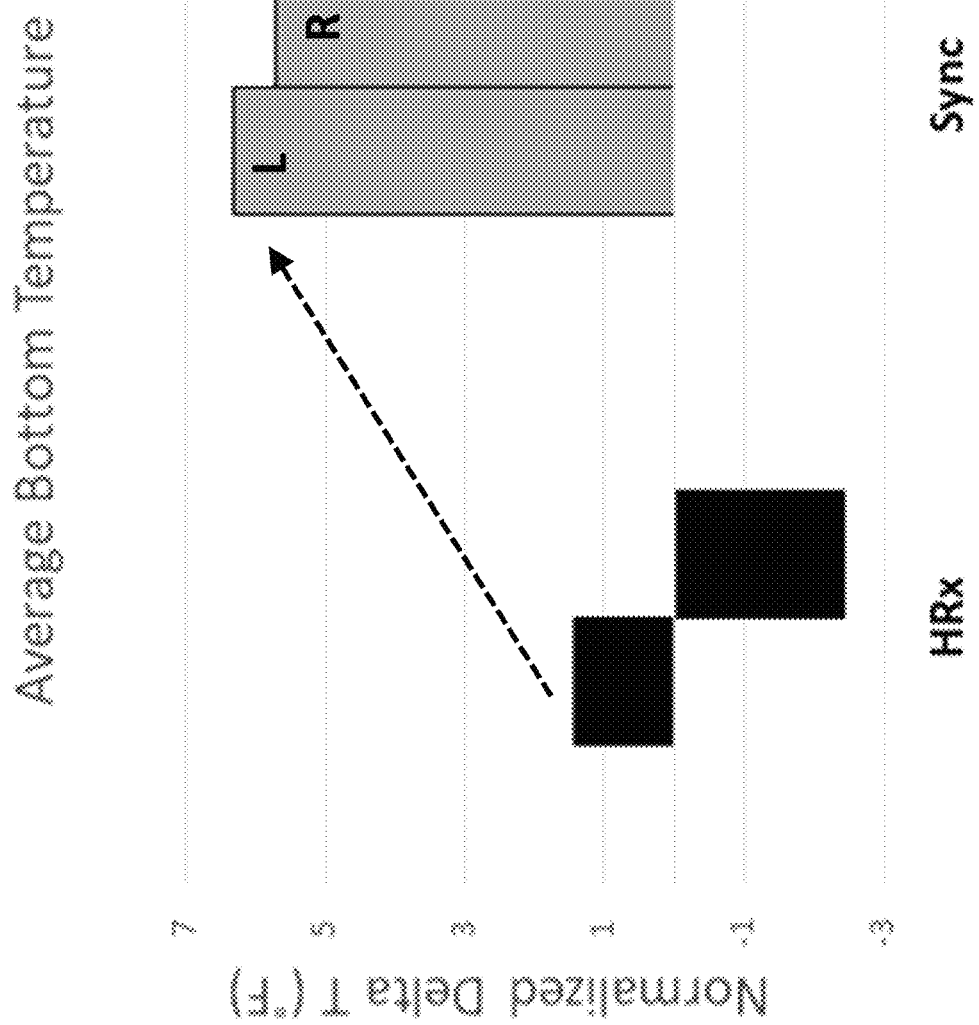
FIG. 9 is a graphical summary of results showing bottom temperature variations of non-synchronized and synchronized double-staged burners relative to the non-synchronized single-staged burner.

FIG. 9 shows the normalized temperature difference (ΔT) of the average bottom temperatures for the double-staged burner, with synchronization ("Sync") and without synchronization ("HRx"). The results shown here are normalized to measurements from a single-staged burner without synchronization that was installed prior to the start of the trial. The average bottom temperatures for the double-staged synchronized boost case increased by 6° F. relative to the single-staged burner. Moreover, the changes for the left and right side thermocouple are nearly the same, implying that the flames were stable and well-balanced for both the firing and exhaust halves of the regenerator cycle. By contrast the average bottom temperature for the double-staged burner without synchronized boosting exhibited mixed results. Specifically, the left bottom thermocouple was slightly higher than for the single-staged burner, while the right bottom thermocouple was slightly lower. The left versus right side imbalance can be attributed to flame instability due to the lack of optimal flames for both halves of the regenerator cycle due to the absence of burner synchronization.

Figures 10A, 10B, 10C:
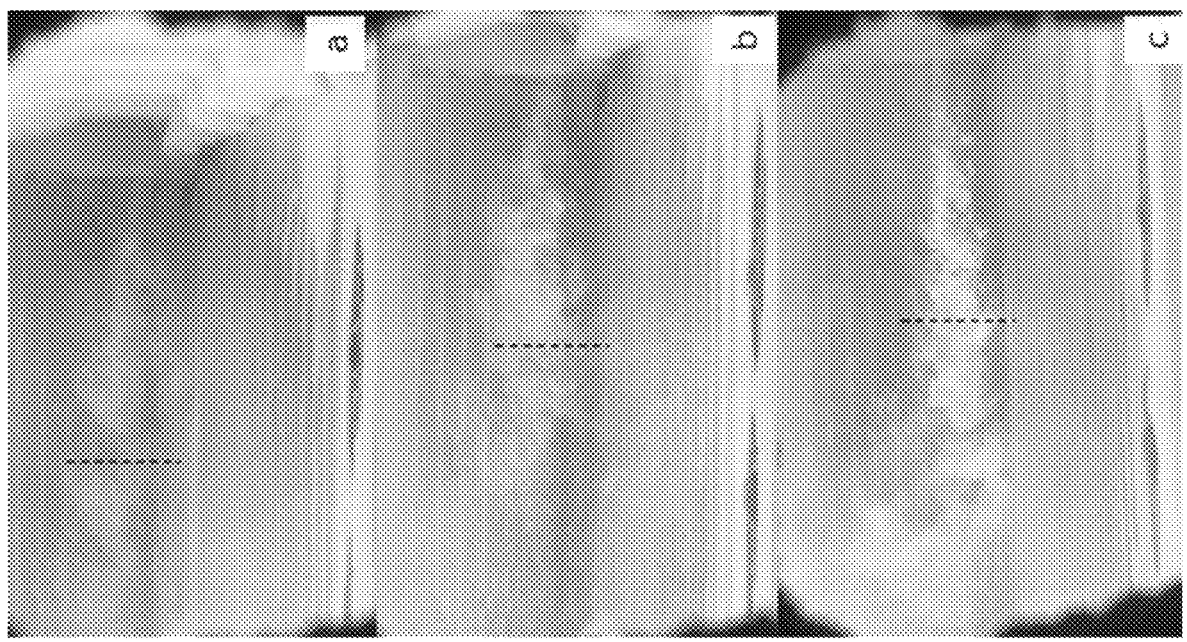
FIGS. 10A, 10B, and 10C are photographs comparing left side oxy-fuel boost burners with opposed (right) side air-fuel burner firing. The view is from the throat end (discharge end) wall looking back at the charge wall.

Moreover, the "average" relative performance of the burners with respect to glass bottom temperature can be qualitatively understood with reference to the flame photographs shown in FIGS. 10A, 10B, and 100, which were taken during the exhaust phase of the regenerator cycle. The flame from the single-staged non-synchronized burner in FIG. 10A appears diffuse, affected by turbulence. The flame from the double-staged non-synchronized burner in FIG. 10B appears straighter and more consistent, but staging is limited to keep flame properties consistent during reversals of firing in the furnace. The flame from the double-staged synchronized burner in FIG. 10C is longer and more luminous, and staging can be maximized, enabling better heat transfer to the batch. In sum, these photos highlight the longer and more luminous flame achieved with the double-staged synchronized boost burner (FIG. 10C) relative to the two non-synchronized cases (FIGS. 10A and 10B). The longer, brighter flame of FIG. 10C clearly has more surface area and higher emissivity, which would lead to higher rates of flame-to-glass heat transfer; thus, higher bottom temperature.

Impact on Furnace Crown Temperature.

Figure 11:
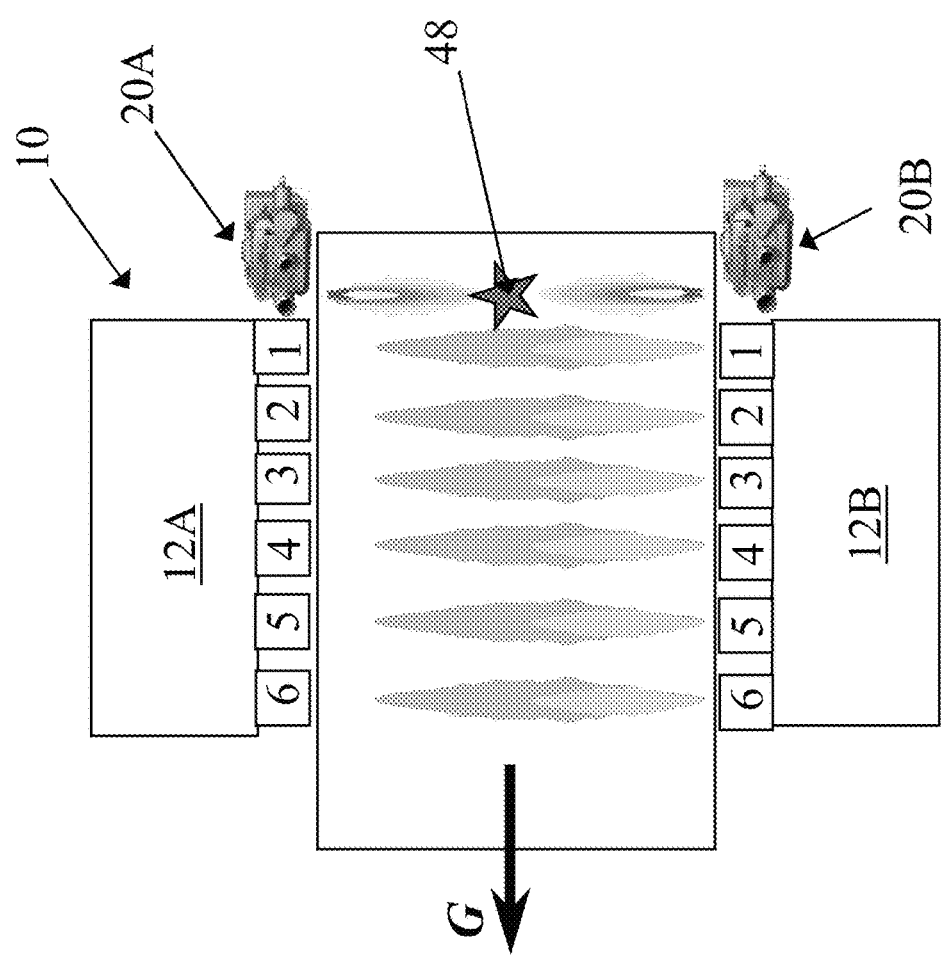
FIG. 11 is a plan view schematic of the furnace showing location of the furnace crown thermocouple nearest the boost burners.

Operation with relatively low crown temperatures is desirable as this refractory life and reduces refractory-based glass defects (stones). A crown thermocouple 48 nearest to the boost burners 20A and 20B in the furnace 10 is located centrally between the burners 20A and 20B, and approximately 12 feet from the charge end wall, which is within approximately 4 feet down-tank of the burners, as illustrated in FIG. 11.

Figure 12:
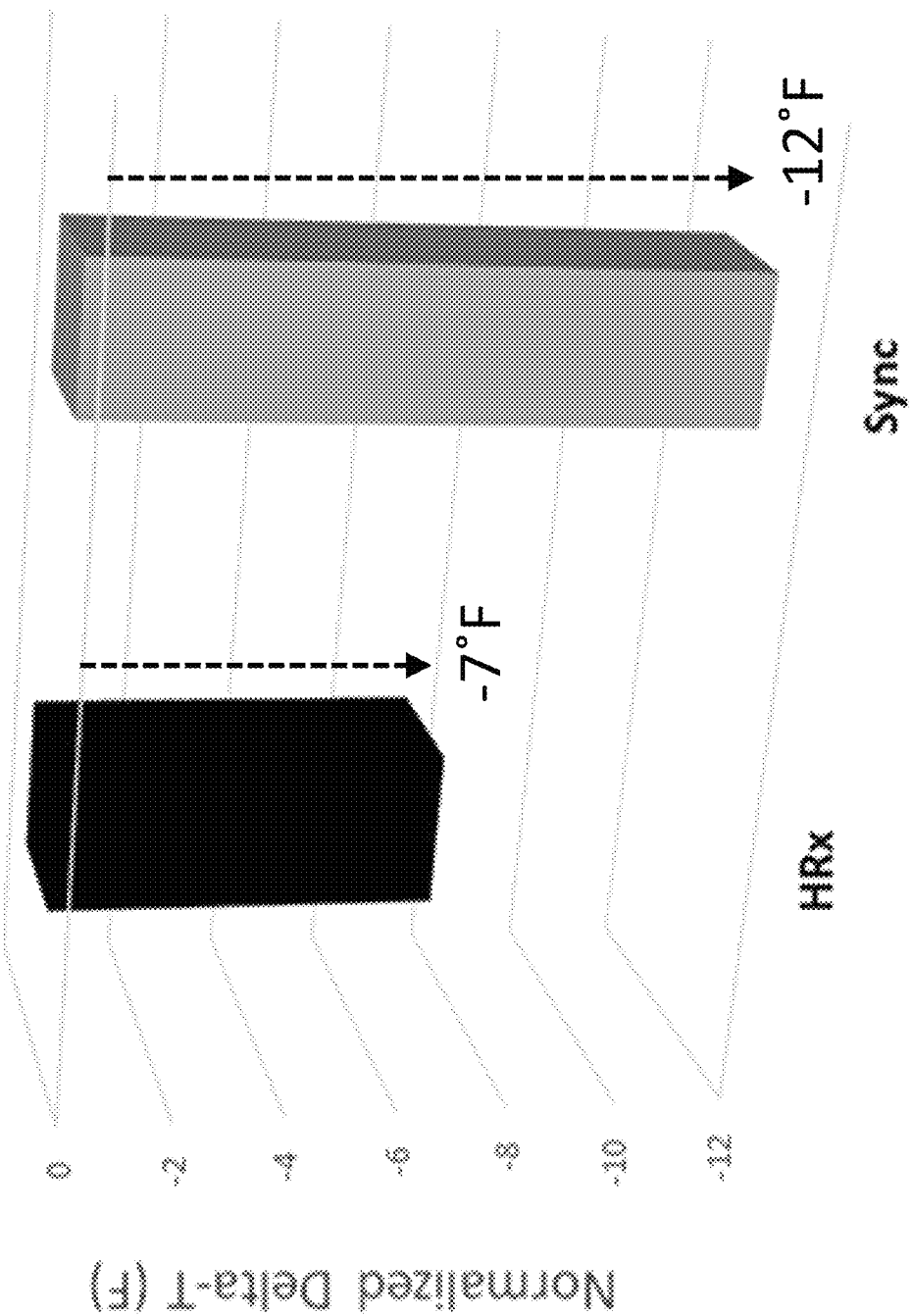
FIG. 12 is a graph comparing the average crown thermocouple temperature nearest the boost burners for non-synchronized and synchronized double-staged burners relative to the non-synchronized single-staged burner.

FIG. 12 shows the average temperature difference of the local crown thermocouple of the double-staged burner, with and without synchronization, versus the single-staged burner results. The double-staged burner ("HRx") without synchronized boosting shows an average temperature decrease of about 7° F. as compared to the previously installed single-staged burner. This is principally due to the fact that the double-staged burner has higher flame momentum than the single-staged burner and can achieve a higher degree of under-flame staging. As explained in U.S. Pat. No. 10,584,051, a higher degree of under-flame staging creates a more dense layer of soot particles above the flame that impedes the transmission of radiant flame energy upward to the crown. Moreover, the higher momentum of the double-staged burner prevents, to a degree, flame lofting toward the crown, also tending to lower crown temperature. The double-staged burner with synchronized boosting ("Sync") showed an even greater decrease of approximately 12° F. of the average crown temperature. This result highlights the effectiveness of the synchronized boost system where the double-staged burner flame properties are fully optimized to maximize flame luminosity and momentum thereby directing a higher proportion of heat transfer into the glass melt.

Impact on Glass Defects.

Figure 13:
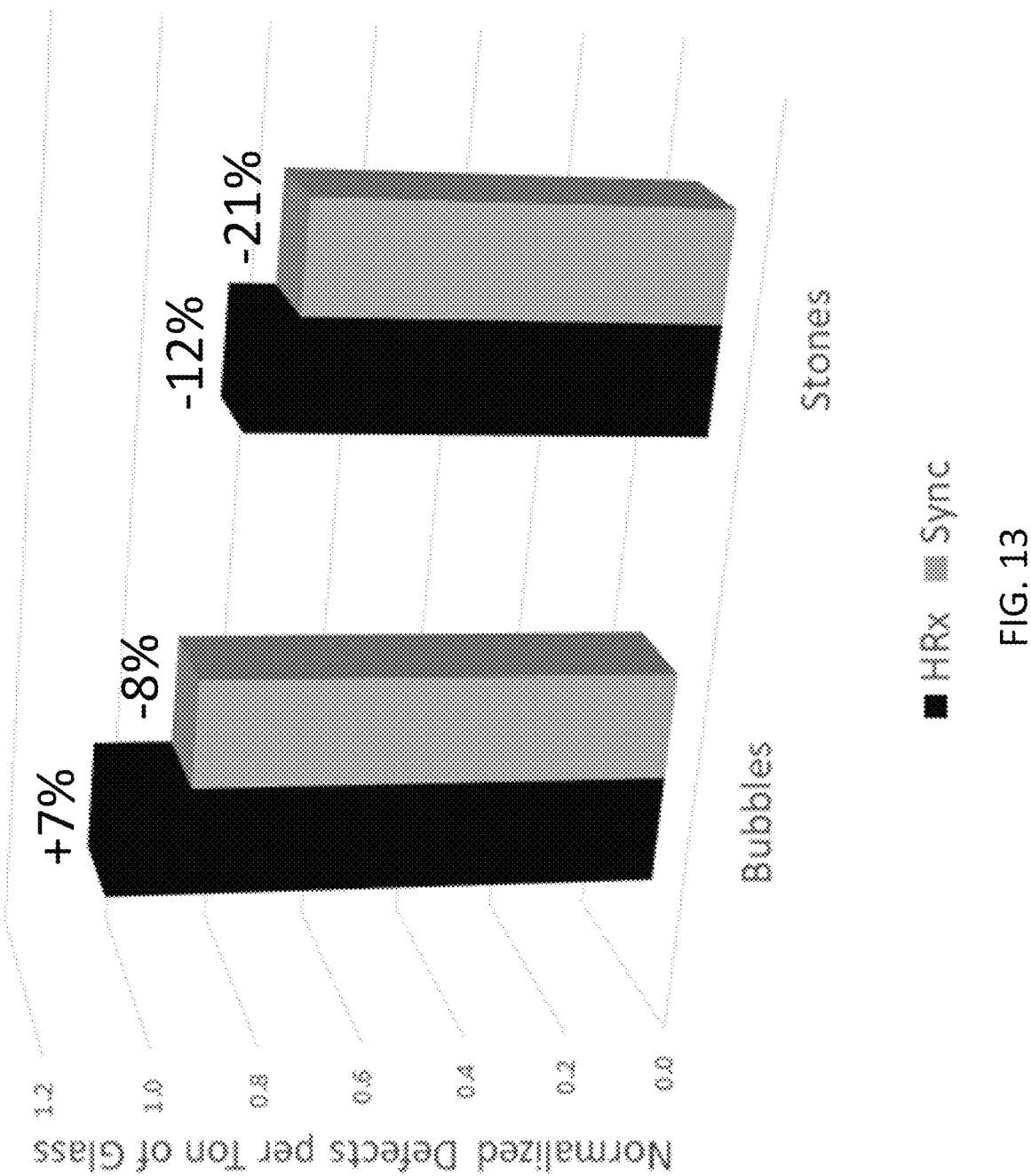
FIG. 13 is a graph comparing the glass defects per ton of glass, with regard to bubbles and stones, for non-synchronized and synchronized double-staged burners relative to the non-synchronized single-staged burner.

Glass defect data for bubbles and stones was calculated on the basis of the average number of defects per ton of produced glass. The defect data for the double-staged burner with and without synchronization was again normalized versus the single-staged burner data, and is shown in FIG. 13. The double-staged synchronized boost system results exhibited an 8% and 21% decrease in bubbles and stones, respectively. These favorable results follow logically from the increase in glass bottom temperature and reduction in crown temperature also achieved using the synchronized system. That is, as previously explained, the higher bottom temperatures lead to reduced bubbles due to strengthened natural circulation within the glass melt, while the lower crown temperatures reduce refractory run-down into the glass, thereby reducing the "stones". The double-staged burner without synchronized boosting showed a slight increase in defect bubbles, which is not unexpected given the slightly lower average bottom temperature (average of left and right thermocouples) as shown in FIG. 9. Moreover, the double-staged burner without synchronized boosting showed a 12% decrease in stones, presumably again due to the lower crown temperatures.

Specific Enemy Consumption.

Figure 14:
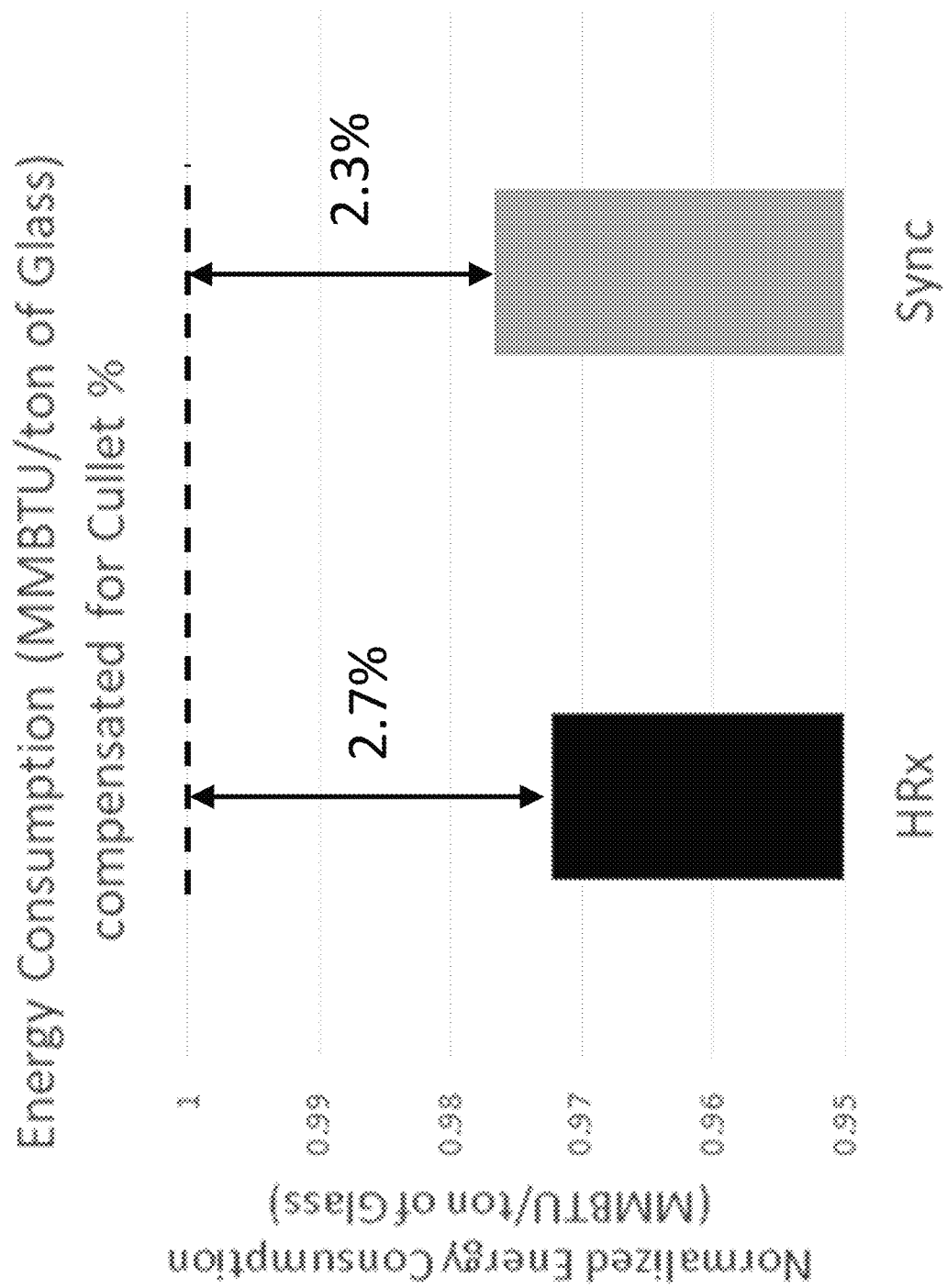
FIG. 14 is a graph showing average specific furnace energy consumption, corrected for variations in cullet percentage for non-synchronized and synchronized double-staged burners relative to the non-synchronized single-staged burner.

Furnace specific energy consumption was the most difficult parameter to assess as it is an indirect calculation involving several test variables, not all of which were controlled during the test program. Specifically, energy consumption was evaluated by multiplying the total natural gas consumption rate for air-fuel burners by the natural gas heating value and dividing by the total tons of glass produced over the evaluation. Energy consumption results were then corrected for changes in the average percent of cullet used in each of the three test periods. Results presented in FIG. 14 indicate that the corrected energy consumption for both double-staged burners was approximately 2.5% lower than for the single-staged burner. It is worth noting that energy consumption results may have been influenced by the furnace control system, which had been made operational just prior to the start of the trial. This control system was not of the conventional type that relies on key furnace temperatures to straightforwardly moderate fuel flow rate. Rather, it adjusted air-fuel firing rates based on a complex non-linear algorithm derived from continuous learning/data reduction. The fact that hardware (oxy-fuel burners) and operational changes (burner synchronization) were made between trial phases may thus have influenced learning patterns and affected control responses. Even so, it is clear the double-staged burner, with and without synchronization, reduced energy consumption with respect to the baseline single-staged burner.

In summary, the synchronized boosting system was designed to overcome the high turbulence and changing air currents inherent with oxy-boosting inside air-fired regenerative side port furnaces. The oxy-fuel boost burner performance is improved by allowing customized flame properties (momentum, luminosity) to be automatically set for each burner with each regenerator reversal cycle. The results of the testing described herein showed that the synchronized boosting system is capable of generating more favorable furnace crown and bottom temperatures as well as significant improvements in glass quality with a 2-3% reduction in energy consumption.

The present invention is not to be limited in scope by the specific aspects or embodiments disclosed in the examples which are intended as illustrations of a few aspects of the invention and any embodiments that are functionally equivalent are within the scope of this invention. Various modifications of the invention in addition to those shown and described herein will become apparent to those skilled in the art and are intended to fall within the scope of the appended claims.

The invention claimed is:

1. A system for synchronized oxy-fuel boosting of a regenerative glass melting furnace having a first set of regenerative air-fuel burners and a second set of regenerative air-fuel burners, and a furnace control system programmed to control alternate firing of the first set of air-fuel burners and the second set of air-fuel burners such that when the first set of air-fuel burners is firing the second set of air-fuel burners is regenerating, and when the first set of air-fuel burners is regenerating the second set of air-fuel burners is firing, the system comprising:
   a first double-staged oxy-fuel burner mounted in a first wall of the furnace and having a primary oxygen valve to apportion a flow of oxygen between primary oxygen and staged oxygen and a staging mode valve to apportion the flow of staged oxygen between an upper staging port and lower staging port;
   a second double-staged oxy-fuel burner mounted in a second wall of the furnace, the second wall being opposite the first wall, and having a primary oxygen valve to apportion a flow of oxygen between a flow of primary oxygen and a flow of staged oxygen and a staging mode valve to apportion the flow of staged oxygen between a flow of upper staged oxygen to the upper staging port and a flow of lower staged oxygen to the lower staging port; and
   a controller programmed to:
      receive a signal from the furnace control system indicating which of the first and second sets for air-fuel burners is firing and which of the first and second sets of air-fuel burners is regenerating; and
      send signals to the actuate the primary oxygen valve and the staging mode valve of the first double-staged oxy-fuel burner and to actuate the primary oxygen valve and the staging mode valve of the second double-staged oxy-fuel burner, in response to the signal from the furnace control system, to adjust flame characteristics of the first double-staged oxy-fuel burner and the second double-staged oxy-fuel burner.

2. The system of claim 1, wherein each of the first double-staged oxy-fuel burner and the second double-staged oxy-fuel burner includes a central precombustor configured and arranged to receive a flow of fuel and the flow of primary oxygen, an upper staging port configured and arranged to receive the flow of upper staged oxygen, and a lower staging port configured and arranged to receive the flow of lower staged oxygen, wherein the flow of oxygen supplied to the each of the first and second double-staged oxy-fuel burners is the sum of the flow of primary oxygen and the flow of the staged oxygen, and wherein the flow of staged oxygen is the sum of the flow of upper staged oxygen and the flow of lower staged oxygen.

3. The system of claim 2,
   wherein the primary oxygen valve of each of the first and second double-staged oxy-fuel burners is configured and arranged to be actuated between a primary flame position in which a majority of the flow of oxygen is apportioned to the flow of primary oxygen and a staged flame position in which a majority of the flow of oxygen is apportioned the flow of stage oxygen; and wherein the staging mode valve of the each of the first and second double-staged oxy-fuel burners is configured and arranged to be actuated between at least two positions selected from: a foam mode position in which a majority of the flow of staged oxygen is apportioned to the flow of upper staged oxygen; a split mode position in which the flow of staged oxygen is apportioned between the flow of upper staged oxygen and the flow of lower stage oxygen; and a melt mode position in which a majority of the flow of staged oxygen is apportion to the flow of lower staged oxygen.

4. The system of claim 1, wherein the first set of regenerative air-fuel burners is positioned in the first wall and the second set of regenerative air-fuel burners is positioned in the second wall, the furnace further comprising a charge wall perpendicular to and interconnecting between the first wall and the second wall.

5. The system of claim 4, wherein the first double-staged oxy-fuel burner is positioned between the first set of air-fuel burners and the charge wall, and wherein the second double-staged oxy-fuel burner is positioned between the second set of air-fuel burners and the charge wall.

6. The system of claim 1, wherein the first set of regenerative air-fuel burners and the second set of regenerative air-fuel burners are both positioned in a wall perpendicular to and interconnecting between the first wall and the second wall.

7. The system of claim 4,
wherein when the controller receives a signal that the first set of air-fuel burners is firing and the second set of burners is regenerating, the controller sends signals to actuate the primary oxygen valve of the first double-staged burner to the staged position and the staging mode valve of the first double-staged oxy-fuel burner to the melt mode position, and to actuate the primary oxygen valve of the second double-staged oxy-fuel burner to the primary flame position and the staging mode valve of the second double-staged oxy-fuel burner to the split mode position; and
wherein when the controller receives a signal that the second set of air-fuel burners is firing and the first set of burners is regenerating, the controller sends signals to actuate the primary oxygen valve of the first double-staged burner to the primary flame position and the staging mode valve of the first double-staged oxy-fuel burner to the split mode position, and to actuate the primary oxygen valve of the second double-staged oxy-fuel burner to the staged position and the staging mode valve of the second double-staged oxy-fuel burner to the melt mode position.

8. The system of claim 7, further comprising at least one of a first bottom thermocouple positioned to measure a glass bottom temperature proximal to the first wall and the charge wall; a second bottom thermocouple positioned to measure a glass bottom temperature proximal to the second wall and charge wall; and a crown thermocouple positioned to measure a crown temperature near the charge wall;
wherein the controller is further programmed to receive signals from at least one of the first bottom thermocouple, the second bottom thermocouple, and the crown thermocouple indicating the respective temperatures; and to send signals to actuate the primary oxygen valve and the staging mode valve of the first double-staged oxy-fuel burner and to actuate the primary oxygen valve and the staging mode valve of the second double-staged oxy-fuel burner in response to the signals from the furnace control system and the at least one of the first bottom thermocouple, the second bottom thermocouple, and the crown thermocouple, to adjust flame characteristics of the first double-staged oxy-fuel burner and the second double-staged oxy-fuel burner.

9. A method of synchronized oxy-fuel boosting of a regenerative glass melting furnace having a first set of regenerative air-fuel burners and a second set of regenerative air-fuel burners; a first double-staged oxy-fuel burner mounted in a first wall of the furnace; and a second double-staged oxy-fuel burner mounted in the second wall of the furnace; each of the first double-staged oxy-fuel burner and the second double-staged oxy-fuel burner including a central precombustor configured and arranged to receive a flow of fuel and the flow of primary oxygen, an upper staging port configured and arranged to receive the flow of upper staged oxygen, and a lower staging port configured and arranged to receive the flow of lower staged oxygen, the method comprising:
alternating firing of the first set of air-fuel burners and the second set of air-fuel burners, such that when the first set of air-fuel burners is firing the second set of air-fuel burners is regenerating, and when the first set of air-fuel burners is regenerating the second set of air-fuel burners is firing;
detecting which of the first and second sets for air-fuel burners is firing and which of the first and second sets of air-fuel burners is regenerating; and
controlling the flow of primary oxygen to the precombustor, the flow of upper staged oxygen, and the flow of lower staged oxygen for each of the first double-staged oxy-fuel burner and the second double-staged oxy-fuel burner, based on which of the first and second sets for air-fuel burners is firing and which of the first and second sets of air-fuel burners is regenerating, to adjust flame characteristics of the first double-staged oxy-fuel burner and the second double-staged oxy-fuel burner.

10. The method of claim 9, wherein the flow of oxygen supplied to the first double-staged oxy-fuel burner is the sum of the flow of primary oxygen and the flow of staged oxygen, and wherein the flow of staged oxygen is the sum of the flow of upper staged oxygen and the flow of lower staged oxygen.

11. The method of claim 9, wherein the first set of regenerative air-fuel burners is positioned in the first wall and the second set of regenerative air-fuel burners is positioned in the second wall, the furnace further comprising a charge wall perpendicular to and interconnecting between the first wall and the second wall.

12. The method of claim 11, wherein the first double-staged oxy-fuel burner is positioned between the first set of air-fuel burners and the charge wall, and wherein the second double-staged oxy-fuel burner is positioned between the second set of air-fuel burners and the charge wall.

13. The method of claim 9, wherein the first set of regenerative air-fuel burners and the second set of regenerative air-fuel burners are both positioned in a wall perpendicular to and interconnecting between the first wall and the second wall.

14. The method of claim 11, wherein the first wall of the furnace is positioned to the right of the charge wall and the second wall of the furnace is positioned to the left of the charge wall, further comprising:
when the first set of air-fuel burners is firing and the second set of burners is regenerating, actuating the primary oxygen valve of the first double-staged burner to the staged position and the staging mode valve of the first double-staged oxy-fuel burner to the melt mode position, and actuating the primary oxygen valve of the second double-staged oxy-fuel burner to the primary flame position and the staging mode valve of the second double-staged oxy-fuel burner to the split mode position; and when the second set of air-fuel burners is firing and the first set of burners is regenerating, actuating the primary oxygen valve of the first double-staged burner to the primary flame position and the staging mode valve of the first double-staged oxy-fuel burner to the split mode position, and actuating the primary oxygen valve of the second double-staged oxy-fuel burner to the staged position and the staging mode valve of the second double-staged oxy-fuel burner to the melt mode position.

15. The method of claim 14, further comprising measuring at least one of a first glass bottom temperature proximal to the first wall and the charge wall, measuring a second glass bottom temperature proximal to the second wall and the charge wall, and measuring a crown temperature near the charge wall; and controlling the flow of primary oxygen to the precombustor, the flow of upper staged oxygen, and the flow of lower staged oxygen for each of the first double-staged oxy-fuel burner and the second double-staged oxy-fuel burner, based on which of the first and second sets for air-fuel burners is firing and which of the first and second sets of air-fuel burners is regenerating, the measured first glass bottom temperature, the measured second glass bottom temperatures, and the measured crown temperature, to adjust flame characteristics of the first double-staged oxy-fuel burner and the second double-staged oxy-fuel burner.

* * * * *